April 1, 1969

A. S. WINDELER 3,436,287

COAXIAL CABLE MANUFACTURING METHOD

Filed July 2, 1965

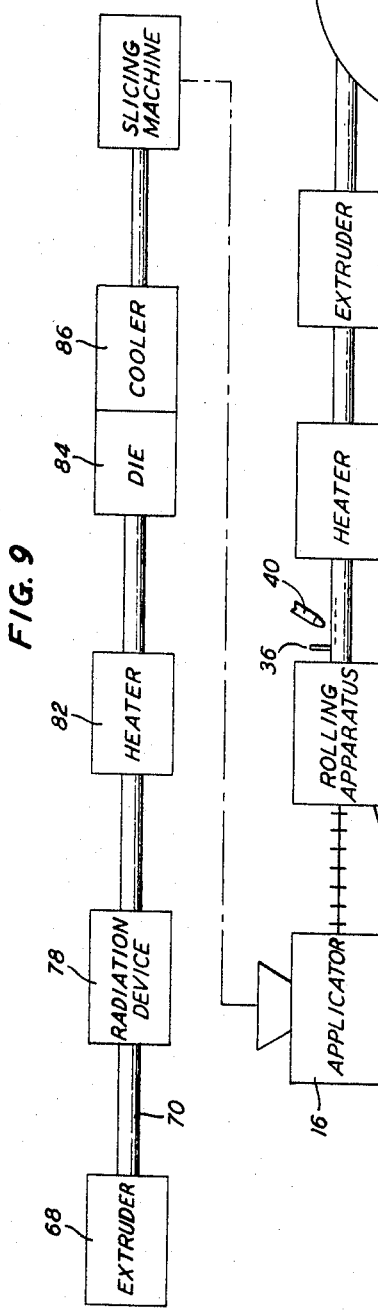
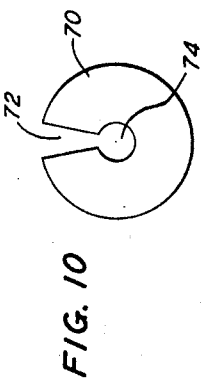
FIG. 9
FIG. 10

United States Patent Office 3,436,287
Patented Apr. 1, 1969

3,436,287
COAXIAL CABLE MANUFACTURING METHOD
Alfred S. Windeler, Madison, N.J., assignor to Bell Telephone Laboratories, Incorporated, New York, N.Y., a corporation of New York
Filed July 2, 1965, Ser. No. 469,291
Int. Cl. H01b 13/22; B32b 1/10
U.S. Cl. 156—54                                                   13 Claims

ABSTRACT OF THE DISCLOSURE

Coaxial cable is manufactured by surrounding a center conductor with a compressed dielectric material having an elastic memory and, after forming a loosely fitting outer conductor about the compressed material, heating the material so it expands and fills the space between the conductors. The space between the conductors may receive a welding shoe that protects the material while a seam is welded on the outer conductor during the forming process.

---

This invention relates to manufacture of coaxial cable, particularly although not exclusively to cables whose outer conductors must be welded or otherwise treated in a manner potentially degrading to cable parts such as the insulation spacing the outer conductor from the inner conductor.

In the past, cables whose outer conductors had welded seams were manufactured by first making the outer conductor larger than the desired diameter. They were completed by welding the seam while a space existed between the interconductor insulation and the outer conductor, and then crimping or swaging the outer conductor down onto the insulation. Crimping imparts an undesirable shape to the outer conductor. It is wasteful insofar as material is concerned, and the ultimate cable requires considerable radial space. Swaging hardens the outer conductor needlessly.

An object of this invention is to avoid the degrading effects caused by end treatment of the outer conductor.

Another object of this invention is to permit welding of the outer conductors or cables without harming the interconductor insulation and at the same time avoid the above difficulties.

Another object of this invention is to permit joining the seams of an outer conductor on a cable at the particular desired cable conductor size without interference from the interconductor insulation.

Still another object of the invention is to simplify cable manufacturing procedures.

According to the invention these objects are accomplished in whole or in part by separating the inner from the outer conductors with a dielectric that has been cured and radially compressed to fit loosely in the outer conductor, but which possesses an elastic memory that causes it to expand radially when heated, and heating the dielectric to fill the outer conductor. Welding a seam can be accomplished during the loose fit. Thus here as in the prior art the welding operation also takes place with a space between the insulation and the outer conductor. However, contrary to the prior art, instead of compressing the outer conductor, the insulation is expanded to meet the outer conductor as a result of the elastic memory imparted to the insulation.

These and other features of the invention are pointed out in the claims forming a part of this specification. Other objects and advantages of the invention will become obvious from the following detailed description when read in light of the accompanying drawings, wherein:

FIG. 9 is a schematic diagram illustrating still another method of performing the present invention;

FIG. 10 is a cross sectional view of an insulating spacer being used in FIG. 9;

Figure 1:
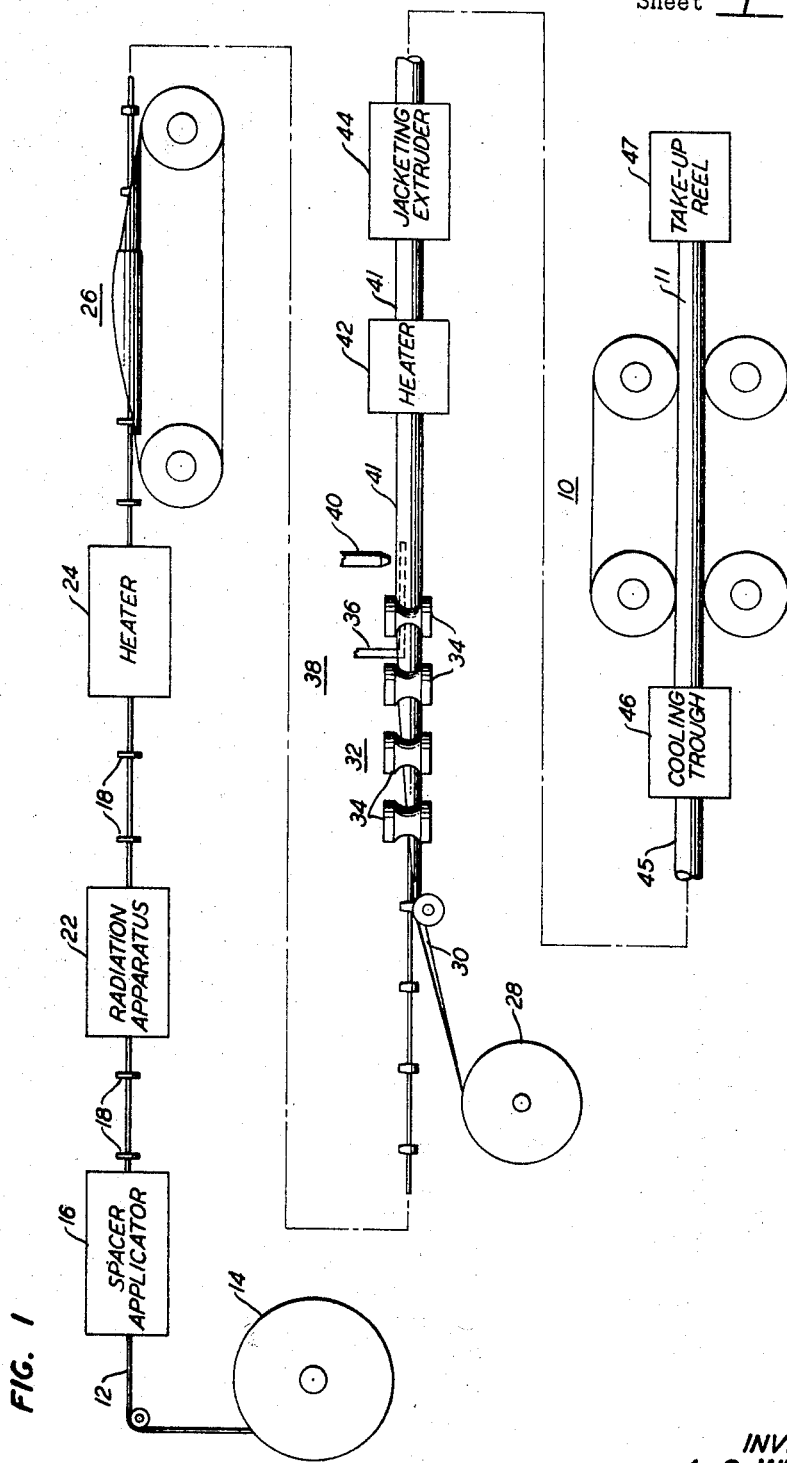
FIG. 1 is a schematic, partly pictorial diagram illustrating a method embodying features of the invention.

In FIG. 1 a capstan 10 draws a jacketed coaxial cable 11 as well as the components of the cable being formed according to the invention. The inner or center conductor 12 of the cable 11 is drawn from a wire supply 14 and passes through a disk applicator 16. The latter surrounds intermittent locations of the moving conductor 12 with disk-shaped spacers 18 for separating the inner conductor 12 from a coaxial outer conductor to be applied. The spacers 18 are made of polyethylene or other electrically low-loss plastic with molecules capable of being cross-linked and are shown in more detail in FIG. 2. They have a central opening 19 for grasping the conductor 12 and a cut-out sector 20 through which the conductor 12 passes when the spacer is fitted thereon.

Figure 5:
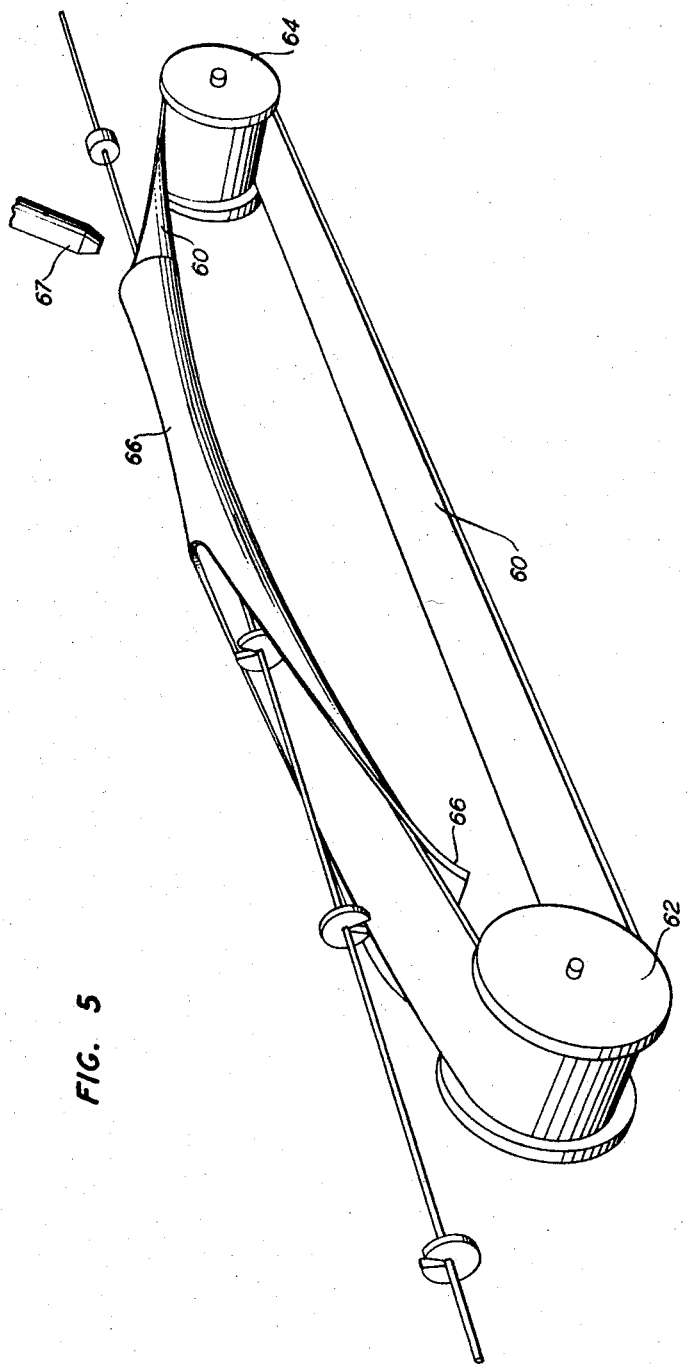
FIG. 5 is a perspective view of the compressing device used in FIG. 1 according to the invention.

A radiation apparatus 22, such as a Van de Graaff generator, bombards the spacers 18 traveling on the moving wire 12 with high-energy electrons that result in curing the polyethylene or cross-linking the plastic molecules. A heater 24, such as an electric heater, elevates the temperature of the polyethylene to the range of 110° C. to 120° C. where they soften and become easily deformable. The hot, cross-linked plastic, disk-shaped spacers advance to a belt former 26. The latter deforms the spacers by compressing them radially inward until their diameters are considerably reduced. Details of the former 26 are shown in FIG. 5.

A spool 28 has drawn therefrom a continuous ribbon 30 of conductive copper. The ribbon 30 is formed into an outer conductor 31 by a roll former 32 having a series of pairs of rolls 34 whose peripheries are concave and have respectively increasing curvatures from pair to pair. The rolls 34 fold the advancing ribbon 30 about the disks 18. They fold the ribbon 30 to a diameter substantially equal to the outer diameter of the spacers 18 prior to their compression by the belt former 26. Just before the ribbon 30 is finally folded by the last pair of rolls 34, a welding shoe 36 of a welding apparatus 38 forces open the space between the folded ribbon 30 that now forms the outer conductor 31 and the compressed spacers 18. The shoe 36 extends beyond the rolls 34 and opposite a welding electrode 40 outside the seam of the conductor 31. The welding electrode 40 forms part of the welding apparatus 38 and welds the seam on the conductor 31 to form a coaxial pair 41.

The coaxial pair 41 now passes through a heater 42 that softens the compressed spacers 18. These have been cross-linked at another diameter and at another shape. By virtue of an elastic memory, heating by the heater 42 causes them to expand to their cross-linked radii and shapes. The outer radii thus conform to the inner diameter of the outer conductor 31. The radii of the openings 19 firmly grip the inner conductor 12. This results in centering the inner conductor 12 precisely within the outer conductor 31. A jacketing extruder 44 surrounds the outer conductor 31 with a jacket 45. A cooling water trough 46 hardens the jacket 45 and at the same time cools the heated spacers 18 below 110° C. so as to freeze them at their larger diameters. The capstan 10 now passes the cable 11 to a take-up reel 47 which stores the cable. If the temperature of extruder 44 is sufficiently high, the heater 42 may be eliminated. The extruder would then heat the spacers 18. If desired, the ribbon 30 may be transversely corrugated.

Figure 3:
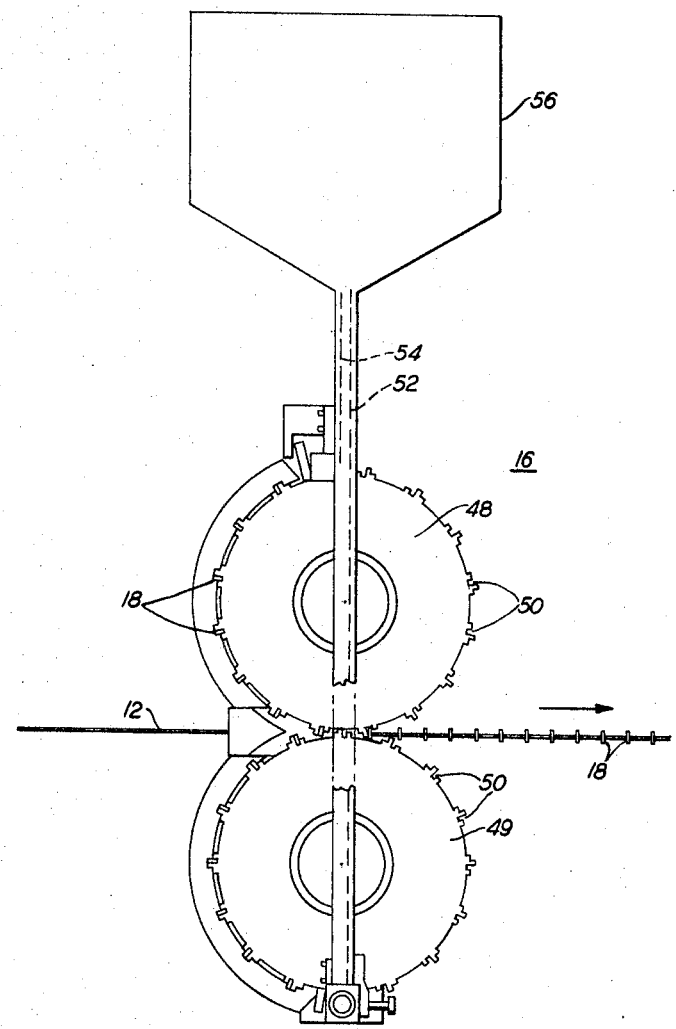
FIG. 3 is an elevation showing the disk applicator of FIG. 1.

FIG. 3 illustrates the disk applicator 16 in more detail. Here the conductor 12 passes between two rotating wheels 48 and 49 having radial slots 50. Two chutes 52 and 54 pass the plastic spacers 18 from a hopper 56 to the slots 50 diametrically opposite the conductor 12. The chutes 52 and 54 fit the spacers into the slots 50 so that the openings 19 extend along the wheel peripheries and the sectors 20 extend outwardly. As the wheels 48 and 49 turn with movement of the conductor 12, the conductor 12 is forced onto holes 19 of the spacers 18 through the sectors 20. The disk applicator is described in more detail in Patents Nos. 2,404,782, 2,579,468, 2,579,486, and 2,579,487.

Figure 4:
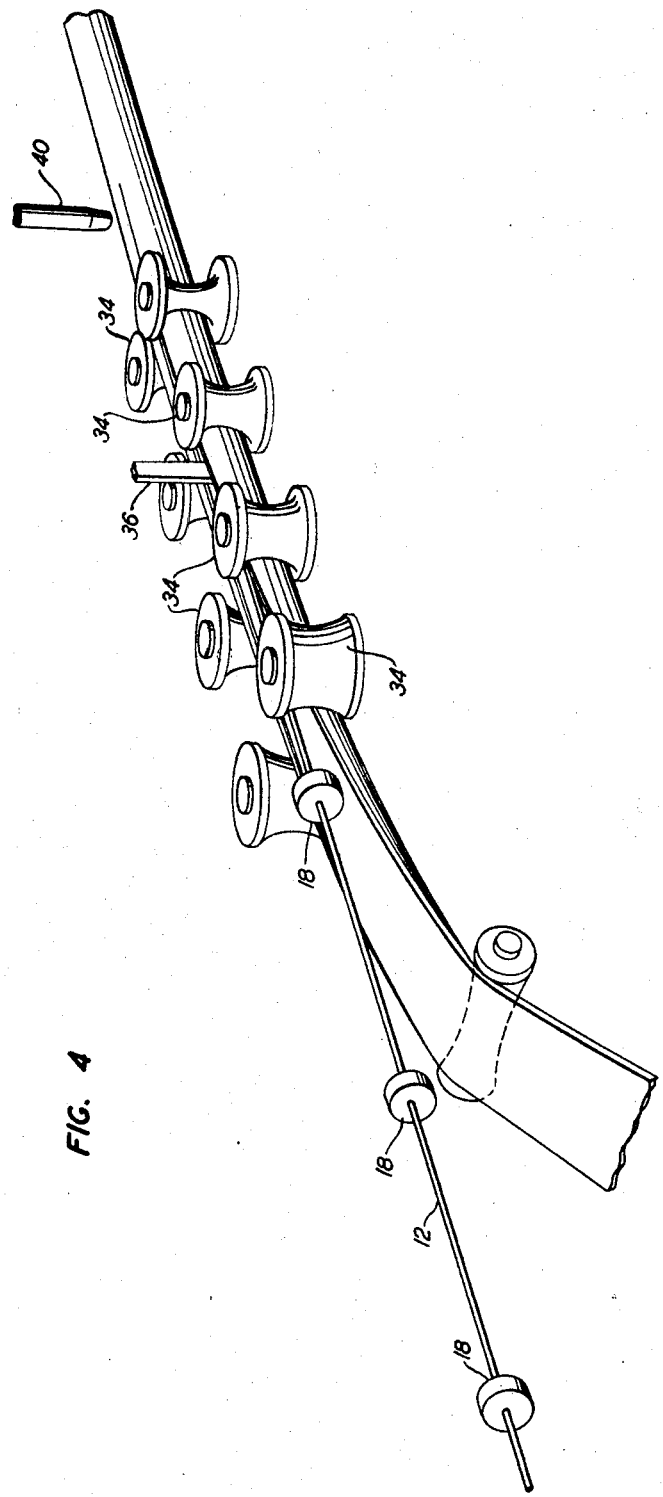
FIG. 4 illustrates in detail the roll former being used in the method of FIG. 1.

FIG. 4 illustrates, in detail, the roll former 32 folding the ribbon 30 about the compressed spacers 18 traveling on the conductor 12. The welding shoe 36 fits between the reduced peripheries of compressed spacers 18 and the outer conductor 31 through the opening of the outer conductor just before the seam is formed at rolls 34 of roll former 32.

FIG. 5 illustrates in detail the belt former 26. In the latter a belt 60 driven in synchronism with the inner conductor 12 on rolls 62 and 64 passes longitudinally through a shoehorn shaper 66 that progressively folds the belt 60 transversely about the inner conductor 12. This continues until the longitudinal edges of the belt overlap each other and form a circular opening whose diameter is equal to the desired size of the spacers 18 when they are compressed. The belt 60 by virtue of its own resilience unfolds and flattens as it passes out of the shaper 66. The shaper 66 comprises a die having a smooth interior whose radius of curvature decreases progressively. The belt slides on this interior. The radius at the exit of shoehorn shaper 66 is larger by the thickness of the belt 60 than the compressed diameter of the spacers 18.

In the compressive action of the former 26 the disks may have their shapes deformed and may not correspond to disks after they pass out of the belt 60 that has compressed them. Nevertheless, the actual shape of the disks is irrelevant as long as they have been compressed.

To maintain the compressed shape of the spacers 18 a nozzle 67 projects a blast of cooling air onto the spacers 18 when the inner conductor 12 carries them out of the unfolding belt 60.

Figure 6:
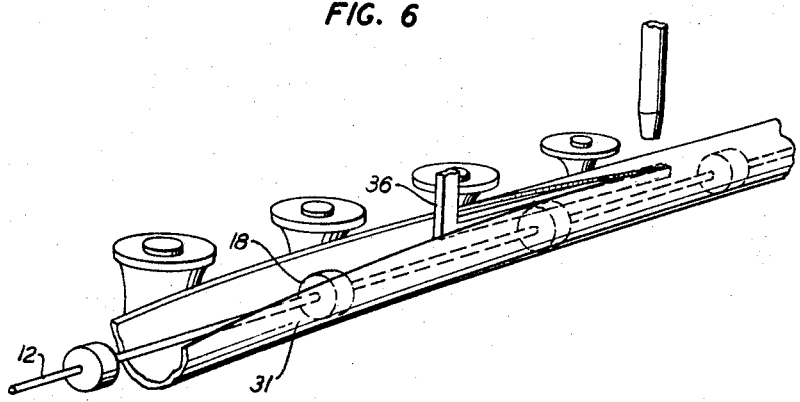
FIG. 6 is a perspective view showing welding of the outer conductor in FIG. 1.

FIG. 6 illustrates the operation of the welding apparatus 38 for welding the seam on the outer conductor 31. Here the rolls 34 on one side of the conductor 31 are omitted to provide a clearer view of the welding operation. The shoe 36, aside from performing its normal welding role, assures a space between the spacers 18 and the seam while electrode 40 welds the seam, by projecting into the outer conductor and forcing the compressed spacers away from the seam should they tend to move in that direction.

Figure 7:
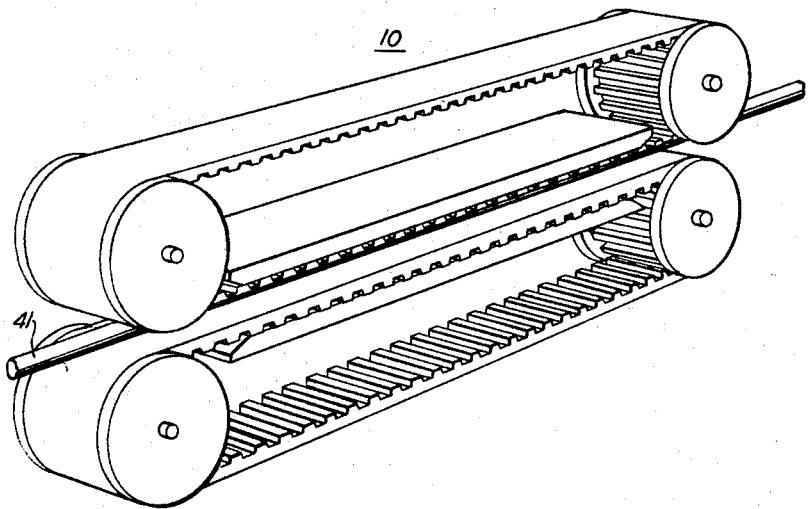
FIG. 7 illustrates perspectively a detail of the capstan in FIG. 1.

FIG. 7 is a detail of the cable 11 being drawn by the capstan 10 after the jacket 45 has been applied and the spacers 18 adjusted to the interior diameter of the outer conductor 31.

In FIG. 1 it is possible that the material of spacers 18 be cured (i.e., their molecules cross-linked) before they are applied on the applicator 16. This involves forming a polyethylene sheet from polyethylene powder heated in the presence of a peroxide catalyst, such as dicumyl peroxide, to the peroxide decomposition temperature of 132° C. to 150° C., cooling the sheet, and punching the spacers 18. The peroxide acts as a catalyst to cross-link the polyethylene molecules. The apparatus 22 in FIG. 1 can now be eliminated.

Figure 2:
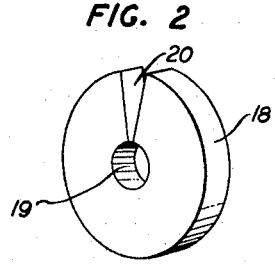
FIG. 2 is a perspective view of the disks forming the spacers in the cable being manufactured according to the invention.
Figure 8:
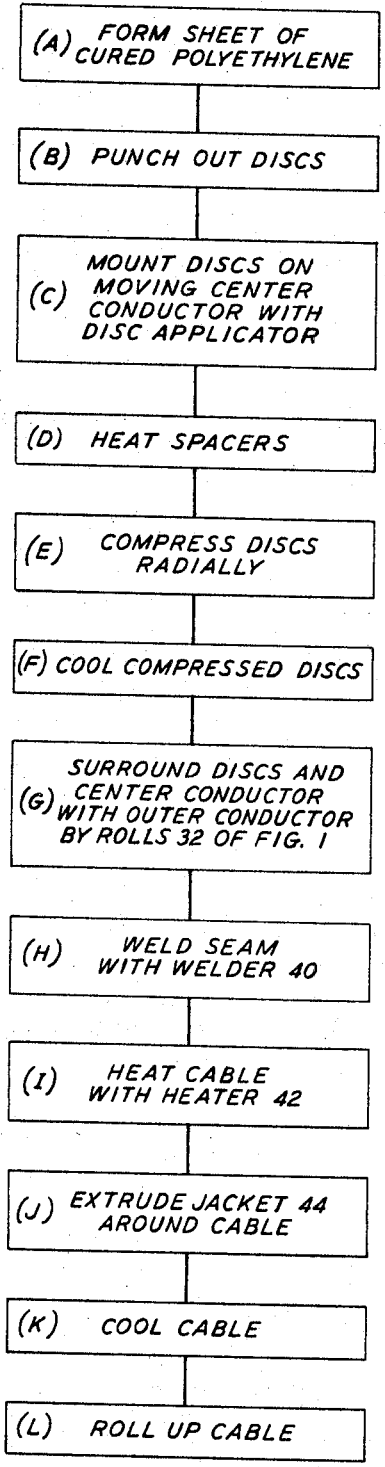
FIG. 8 is a flow chart showing another method of performing the invention.

The flow chart for this method is shown in FIG. 8. In step A a sheet of cured polyethylene having cross-linked molecules is formed by heating polyethylene powder in the presence of dicumyl peroxide to 132° C. to 150° C., forming it into a sheet and cooling it. In step B spacers 18, such as those shown in FIG. 2, are punched out. In step C the disks are dropped into the hopper 56 of the spacer applicator shown in FIG. 3 and applied to the center conductor 12. The spacers 18 are heated in step D by the heater 24. The belt former 26, welding apparatus 38, heater 42, jacketing extruder 44, cooling trough 46, capstan 10, and take-up reel 47 perform the same steps as in FIG. 1. They surround the disks with an outer conductor (step G), weld the outer conductor (step H), heat the spacers 18 (step I), extrude a jacket around the outer conductor (step J), cool the jacket (step K), and roll up the cable (step L). As in FIG. 1, steps I and J may be combined.

According to another embodiment of the invention the diameter at which the spacers 18 are cross-linked in all these methods is slightly larger than sufficient to fit into the outer conductor. The outer conductor 31 is always applied while the spacers 18 are compressed. Thus when heater 42 expands the spacers, they fit very firmly into the welded-seam outer conductor 31. This structure has the advantage of preventing longitudinal migration of the spacers within the outer conductor. Such longitudinal migration has prevailed in the past, and it has been necessary to avoid its effects by using more spacers than mechanically necessary to support the conductors. Such extra spacers have the effect of deteriorating the desired dielectric constant in the space between the inner and outer conductors and results in lines exhibiting greater losses than now necessary. These additional spacers can be eliminated without changing substantially the mechanical characteristics of the cable.

FIG. 9 diagrammatically illustrates still another method of practicing this invention. Here an extruder 68 first forms a continuous cylindrical solid 70 of polyethylene and having, as shown cross sectionally in FIG. 10, a sector-shaped slot 72 and a center opening 74 slightly smaller than center conductor 12. The solid 70 is continuously advanced to a radiation device 78 that cross-links the molecules of the solid 70 by high energy electron bombardment. An electrical heater 80 heats the solid 70 until it becomes soft enough to compress easily. The softened plastic is passed through a suitable die 84 that compresses the outer diameter of solid 70 while retaining the slot 72 and at the same time expands the opening 74 to the diameter of conductor 12. The die extends into a cooler 86 that cools the plastic below 110° C. The solid 70 emerging from the die 84 and cooler 86 is thus "frozen" to its smaller diameter. A slicing machine 88 cuts the compressed solid 70 transversely to its longitudinal direction at thicknesses slightly greater than the final desired thickness of spacers 18.

The compressed and cut disks are fed into the hopper of a disk applicator corresponding to the applicator 16 which applies the compressed spacers onto an inner conductor 12. The roll former 32 of FIG. 1, welding apparatus 38, heater 42, extruder 44, cooling trough 46, and take-up reel 47 of FIG. 1 complete the cable in a manner corresponding to that of FIG. 1. Again, here the functions of heater 42 and extruder 44 may be combined.

Figure 11:
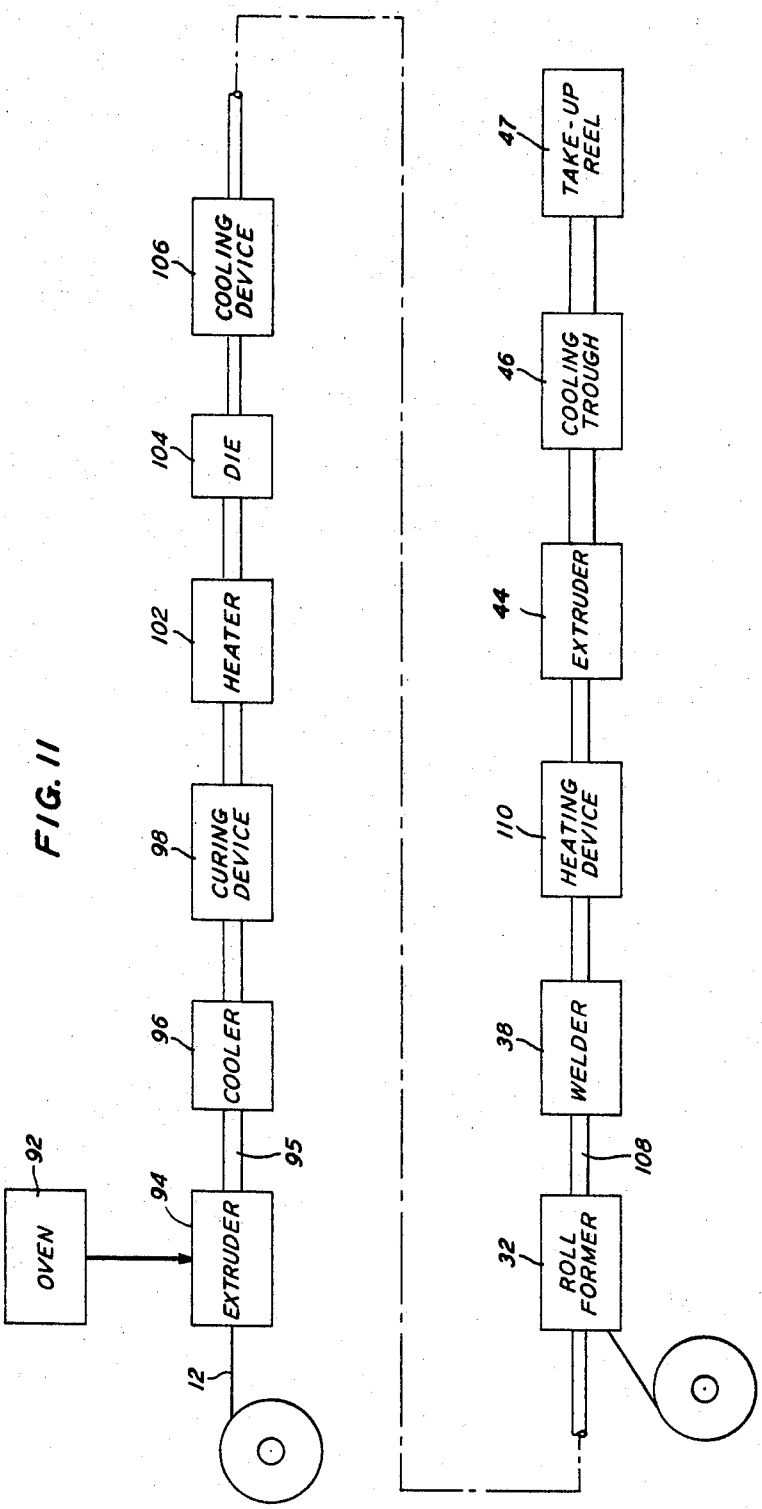
FIG. 11 is a schematic diagram illustrating still another method of performing the present invention.

The method of the invention may be practiced effectively on a cable having expanded, porous dielectric spacing. This is accomplished according to the diagram of FIG. 11. Here a number of polyethylene pellets are loaded into an oven 92 and dusted with a gas releasing powder such as azodicarbonamide before heating. When heated, the pellets become plastic and fuse together. The gas releasing powder acts like a leavening agent, similar to yeast in bread, and causes polyethylene to expand and entrap the released gas. The hot expanded polyethylene passes to an extruder 94 which applies it continuously around an inner conductor corresponding to conductor 12 entering the extruder to form a continuous spacer 95. The resulting product is drawn, after cooling in a cooler 96, through a radiating device 98 wherein the expanded polyethylene spacer is electron bombarded and thus cured to cross-link its molecules. At this point the expanded polyethylene consists of a matrix of gas and polyethylene having up to 65 percent gas. The gas is gradually replaced by air as diffusion takes a place.

After curing, the inner conductor, surrounded by the foam-like polyethylene spacer 95, passes through a heater 102 which softens the foam-like polyethylene and in turn passes it to a compressing die 104 that readily compresses the softened expanded polyethylene to a smaller diameter. A cooling device 106 immediately following the compressing die 104 "freezes" the expanded polyethylene at its smaller diameter. The resulting center conductor 12 with surrounding polyethylene spacer 95 passes through the roll former 32 of FIG. 1 that surrounds it with an outer conductor 108 having a larger diameter. A welding shoe similar to shoe 36 of the welding apparatus 38 of FIG. 1 partially enters in the space between the compressed polyethylene, and an electrode such as electrode 40 welds a seam along the outer conductor 105. An electrical or other heating device 110 softens the polyethylene spacer 95 until it returns to its cross-linked size by virtue of its plastic memory. An extruder 44 coats it with a polyethylene jacket. A cooling trough 46 hardens the jacket, and a reel 47 as in FIG. 1 takes up the completed cable. The cable is drawn along as in FIG. 1 by a capstan, not shown, in FIG. 11. The heating device 110 may be eliminated and the spacers expanded from the extrusion heat, if that heat is sufficient.

The continuous sxpanded polyethylene spacer by virtue of its high air content has a comparatively low dielectric constant suitable for a low transmission loss cable.

In all these embodiments the welding may be ultrasonic. In that case the shoe 36 must also be used. The electrode 40 then constitutes an ultrasonic transducer.

The invention is further useful in manufacturing seamless coaxial cable. Previously this had been done by sliding an elongated center conductor carrying a dielectric into a seamless aluminum tube and swaging the tube down onto the dielectric. The swaging process hardened the tube and made bending or other handling of the thus formed cable difficult. This was particularly so in long cable lengths such as 1,000 feet. According to the invention the need for such swaging is obviated by forming the tube that constitutes the outer conductor at its final size and sliding therethrough a wire carrying a cured plastic dielectric that has been radially compressed. Heating of the dielectric then fills the space between the tube and the inner conductor.

Figure 12:
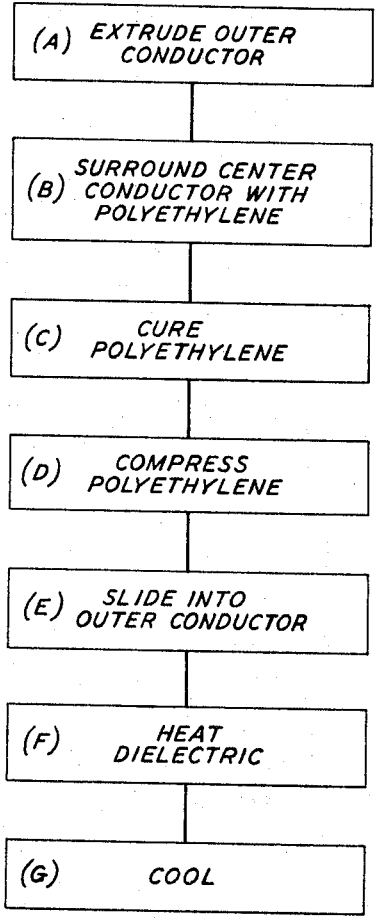
FIG. 12 is a flow diagram illustrating yet another method for performing the present invention.

This process is shown in the flow diagram of FIG. 12. Here, in step A, the seamless tube is formed to the final size by extruding a metal billet through a round die having a center mandrel in the usual manner. Step B involves surrounding an elongated center conductor with polyethylene. The radial diameter of the polyethylene is at least as great as the inner diameter of the outer conductor and preferably slightly greater. The polyethylene may be either the spacers 18 shown in FIG. 2 or expanded polyethylene. In step C the polyethylene dielectric is cured by subjecting it to high-energy electron bombardment with a Van de Graaff generator. This cross-links the molecules in the polyethylene. In step D the polyethylene dielectric is compressed with the apparatus such as that shown in FIG. 5. This is followed by step E, sliding the center conductor carrying the compressed polyethylene into the outer conductor, and then heating the dielectric, preferably as part of a step which extrudes an outer jacket about the outer conductor. The cable, in step G, is cooled.

The dies and methods for forming seamless tubing are well known in the art and are the same as those used by the prior art methods except for the sizes to be extruded.

As used in the specification, the term "cured" or "curing" refers not only to chemically cured or chemically curing plastic but embraces the concept of other operations that cross-link the molecules of the plastic, such as high-energy electron bombardment or ultraviolet radiation.

While several embodiments of this invention have been described in detail, it will be obvious that the invention may be practiced otherwise without departing from its spirit and scope.

What is claimed is:

1. The method of manufacturing a coaxial cable which comprises, heating a cured plastic material whose molecules are cross-linked, compressing said heated material, carrying said material on a conductor passing through the material so that the compressed dimensions are transverse to the length of the conductor, cooling said compressed material, progressively forming around said compressed material a continuous conducting tube having inner dimensions larger than said compressed material while feeding the tube and said material longitudinally at the same velocity, heating the material so that it expands toward its precompressed dimensions, and cooling the material.

2. The method of manufacturing coaxial cable which comprises, curing a plastic material so as to cross-link its molecules and heating the material to soften it, compressing the material and cooling it at compressed dimensions, carrying said material on a conductor passing through the material so that the compressed dimensions are transverse to the conductor, surrounding said material and said conductor with a tube having a seam and inner dimensions sufficient to leave space between the material and said tube, welding the seam while maintaining space between the material and the seam, and heating the material so that it expands toward its cured dimensions within the tube.

3. The method of manufacturing coaxial cable which comprises, curing a plastic material so as to cross-link its molecules at predetermined dimensions and heating the material to soften it, compressing the material and cooling it at compressed dimensions, carrying said material on a conductor passing through the material so that the compressed dimensions are transverse to the conductor, surrounding said material with a tube having a seam and inner dimensions sufficient to leave a space between the material and said tube but smaller than the predetermined dimensions of said material transverse to said conductor, welding the seam while maintaining a space between the material and the seam, and heating the material so that it expands toward its cured dimensions within the tube.

4. The method of manufacturing coaxial cable which comprises, surrounding a conductor with plastic material, curing said material to cross-link its molecules, heating the cured material to soften it, compressing the heated material about said conductor, cooling the compressed material, surrounding the conductor and compressed material with a conductive tube having a seam and dimensions sufficiently large to leave space between said compressed material and said tube, welding the seam of said tube, and heating the material within the tube so that it expands toward its cross-linked size.

5. The method of manufacturing coaxial cable which comprises, surrounding a conductor with plastic material, imparting to the material predetermined dimensions and an elastic memory so that it will return elastically to said predetermined dimensions and including the step of curing the material so as to cross-link the molecules of said material, heating the cured material, compressing the heated material about said conductor, cooling the compressed material so that it will retain its compressed dimensions, forming a conductive sheet around the conductor and compressed material into the shape of a tube having a seam and having inner dimensions equal to the predetermined dimensions so as to leave space between said compressed material and said tube, welding the seam of said tube while holding said material away from said seam, heating the material within the tube so that it expands to its cured dimensions, and jacketing the tube with insulation.

6. The method of manufacturing coaxial cable which comprises, embracing a conductor with a plurality of round and longitudinally separated plastic spacers, curing said spacers to cross-link the molecules of said spacers at a predetermined size, heating said spacers, radially compressing said spacers to a smaller diameter, cooling said spacers, continuously forming around said spacers a metal tube-like conductor having an inner size greater than the compressed size of said spacers, moving said tube as it is formed and moving said spacers longitudinally at the same velocity and heating said spacers so that they return toward their cross-linked size.

7. The method of manufacturing coaxial cable which comprises, embracing a conductor with a continuous sheath of porous plastic, curing said plastic to cross-link its molecules at a predetermined size, heating said plastic, radially compressing said plastic to a smaller diameter cooling said spacers, rolling a metal strip about said spacers and forming a seam therewith, welding the seam while separating the interior plastic therefrom, and heating said plastic so that it returns toward its cross-linked size.

8. The method of manufacturing coaxial cable which comprises, forming a heated elongated plastic body having cross-linked molecules, compressing said heated body in a direction transverse to its longitudinal direction, cooling said compressed body, slicing said body transversely to form a plurality of spacers, mounting said spacers around a conductor at longitudinally separated locations, rolling a sheet around said spacers into a tube having a seam and inner dimensions greater than the compressed dimensions of said spacers, welding said seam while separating said spacers from said seam, and heating said spacers so that they expand toward their predetermined dimensions.

9. The method of manufacturing a cable comprising, forming plastic material, curing said plastic material so as to cross-link its molecules and forming spacers therefrom, mounting said spacers coaxially upon a moving elongated conductor at separated longitudinal locations, heating said spacers, compressing the heated spacers radially, cooling said compressed spacers, surrounding said spacers and conductor with a continuous tube of conductive material having a seam and an inner diameter greater than those of said compressed spacers, welding said seam while separating said spacers from said seam, and heating said spacers so that they expand toward their cured size.

10. The method of manufacturing coaxial cable which comprises, mounting a plurality of round plastic spacers around a moving center conductor, moving said center conductor and said disks through a curing device so as to cross-link the molecules of said spacers, continuously moving said cross-linked spacers through a heating device so as to soften said spacers, continuously compressing said softened spacers by passing them through a die while forcing said spacers through the die by passing a moving belt along the inner die surface at a speed equal to the longitudinal speed of said center conductor, cooling said spacers, folding a continuous elongated ribbon of metal transversely to its direction around said spacers to form an outer conductor having a seam and an inner diameter greater than the compressed diameter of said spacers, extending a welding shoe into said outer conductor as it is being formed and behind said beam so as to force said compressed spacers away from said seam, continuously welding said seam opposite said shoe, and heating said spacers so that their elastic memory causes them to expand.

11. The method of manufacturing coaxial cable which comprises, mounting a plurality of plastic spacers around a moving center conductor, moving said center conductor and said disks through a curing device so as to cross-link the molecules of said spacers, continuously moving said cross-linked spacers through a heating device so as to soften said spacers, continuously compressing said softened spacers by passing them through a die while forcing said spacers through the die by passing a moving belt along the inner die surface at a speed equal to the longitudinal speed of said center conductor, cooling said spacers, folding a continuous elongated ribbon of metal transversely to its direction around said spacers to form an outer conductor having a seam and an inner diameter greater than the compressed diameter of said spacers, extending a welding shoe into said outer conductor as it is being formed and behind said seam so as to force said compressed spacers away from said seam, continuously welding said seam opposite said shoe, and heating said spacers so that their elastic memory causes them to expand, said heating including the step of extruding an insulating jacket around said outer conductor and using the extruding heat to elevate the temperature of said spacers.

12. The method of manufacturing coaxial cable which comprises carrying cured plastic spacer means on a wire conductor, heating the spacer means, compressing the spacer means transverse to the length of the conductor, cooling said compressed spacer means, progressively forming around said compressed spacer means a continuous conductive tube whose inner diameter is larger than said spacer means while feeding the tube and said spacer means longitudinally at the same velocity, heating said spacer means until said spacer means expand, and cooling said spacer means after said spacer means has expanded to the diameter inside the tube.

13. The method of manufacturing coaxial cable which comprises, curing a plastic material so as to cross-link its molecules and heating the material to soften it, compressing the material and cooling it at compressed dimensions, carrying said material on a conductor passing through the material so that the compressed dimensions are transverse to the conductor, surrounding said material with a tube having a seam and inner dimensions sufficient to leave space between the material and said tube, welding the seam while maintaining a space between the material and the seam, and completing the cable by heating the material and covering the tube with an insulating jacket, said completing operation including the step of extruding the jacket around the tube.

References Cited

UNITED STATES PATENTS

| | | | |
|---|---|---|---|
| 3,201,503 | 8/1965 | Benning et al. | 264—230 X |
| 3,325,321 | 6/1967 | Maslona et al. | 156—54 |
| 3,325,325 | 6/1967 | Ward | 156—56 |
| 3,332,814 | 7/1967 | Yoshimura et al. | 156—54 |
| 3,360,409 | 12/1967 | Jachimowicz et al. | 156—54 |

FOREIGN PATENTS 1,094,525  12/1954  France.

EARL M. BERGERT, *Primary Examiner.*

T. R. SAVOIE, *Assistant Examiner.*

U.S. Cl. X.R.

156—83; 174—28, 110, 111; 264—230